(12) United States Patent  
Chien

(10) Patent No.: US 7,735,197 B2
(45) Date of Patent: Jun. 15, 2010

(54) HINGE FOR CIRCUMROTATORY LOCATION

(75) Inventor: Chih-Heng Chien, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 447 days.

(21) Appl. No.: 11/898,672

(22) Filed: Sep. 14, 2007

(65) Prior Publication Data

US 2009/0070958 A1    Mar. 19, 2009

(51) Int. Cl.
E05C 17/64    (2006.01)
(52) U.S. Cl. .............................. 16/337; 16/340; 16/367; 16/374
(58) Field of Classification Search ................... 16/337, 16/338, 340, 374, 367, 330, 303; 248/299.1, 248/299.2, 917–923; 361/679.27, 679.11, 361/679.12; 348/373, 794, 333.06; 455/575.3, 455/575.4, 575.1, 550.1, 90.3
See application file for complete search history.

(56) References Cited

U.S. PATENT DOCUMENTS 2,312,638 A * 3/1943 Gedris ........................ 297/333
2,498,557 A * 2/1950 Lantz .......................... 108/33
5,334,354 A * 8/1994 Johnston et al. ............. 422/104
6,742,221 B2 * 6/2004 Lu et al. ........................ 16/367
6,742,756 B1 * 6/2004 Fimeri et al. ................ 248/479
6,941,618 B2 * 9/2005 Kim ............................. 16/337
7,440,783 B2 * 10/2008 Hyun ....................... 455/575.3
7,526,835 B2 * 5/2009 Chen ........................... 16/367
2006/0021195 A1 * 2/2006 Yamada et al. ................ 16/367

* cited by examiner

Primary Examiner—Chuck Y. Mah
(74) Attorney, Agent, or Firm—Rosenberg, Klein & Lee

(57) ABSTRACT

A hinge for circumrotatory location includes a base, a locating gasket defining a pair of recesses thereon, a top cover defining a third groove in a bottom thereof. The base has a first groove, a second groove above the first groove. A retention slot connects the second groove and has two retention edges. A stop block is rotatably mounted in the retention slot and stretches into the second groove. The retention edges are capable of stopping the stop block. A pair of locating slots corresponding to the recesses are centrosymmetrically defined in the fundus of the third groove. A protrusion protrudes from the bottom of the top cover and adjacent to the third groove. The top cover lies above the locating gasket which is fitted to the first groove. The protrusion rotates around the second groove and is capable of being against two sides of the stop block.

5 Claims, 6 Drawing Sheets

HINGE FOR CIRCUMROTATORY LOCATION

BACKGROUND OF THE INVENTION

1. Field of the Invention

The present invention relates to a hinge, and more particularly to a hinge that can rotate from 0 degree to 360 degree or even more degree to achieve location function.

2. The Related Art

Hinges are widely used to link various electronic parts together such as mobile phone, video camera and so on. A hinge for circumrotatory location is shown in FIG. 9. The hinge for circumrotatory location 700 includes a cover with a top cover 77 and a bottom cover 72, a pivot 71, a plastic ring 73, a stop means 74, a steel ball 75, a turnplate 76 and a latch 78. The stop means 74 includes a chassis 741, a stop tray 742 projecting upward from the stop tray 742 and a stop block 743 extending horizontally and outward from the stop tray 742 with a radian γ. A slide track 744 is formed around the stop tray 742 and connects with the chassis 741 with two ends connecting with the stop block 743. The turnplate 76 is fitted on the stop means 74 with an abutting block 761 formed on an exterior circle thereof. When the turnplate 76 rotates about an axis of the stop means 74, the abutting block 761 is sliding around the slide track 744 until the abutting block 761 abuts against the stop block 743. In the cooperation between the stop means 74 and the turnplate 76, the hinge for circumrotatory location 700 can rotate in a proper range to achieve location function. Meanwhile, the hinge for circumrotatory location 700 can rotate various degrees by replacing the turnplate 76 of various central angle β. Please refer to FIG. 10, with the cooperation of a first turnplate 762 and the second turnplate 763, the hinge for circumrotatory location 700 can rotate in an angle of 0~360 degrees.

However, the hinge for circumrotatory location 700 has so many components that the structure is complex to ensure the hinge for circumrotatory location 700 working effectively. So, it would be desirable to provide a new hinge that is of simple design and low cost.

SUMMARY OF THE INVENTION

An object of the present invention is to provide a hinge for circumrotatory location including a base, a locating gasket, a top cover and a latch. The base has a soleplate with a circular first groove, a circular second groove above the circular first groove which shares a same axis with the circular first groove and has a bigger diameter than the circular first groove. A retention slot connects a part of the edge of the circular second groove and has two retention edges. A center shaft protrudes upward from the center of the circular first groove. A stop block is rotatably mounted in the retention slot and stretches into the circular second groove. The retention edges are capable of stopping the stop block. The locating gasket is fitted to the circular first groove and around the center shaft. At least one pair of recesses are centrosymmetrically defined in a top of the locating gasket for receiving a pair of locating spheres. The top cover defines a center bore in a top thereof, a circular third groove shares a same axis with the center bore and has a bigger diameter than the center bore in a bottom thereof, the circular third groove communicates with the center bore. At least one pair of locating slots are centrosymmetrically defined in the fundus of the circular third groove. A protrusion protrudes downward from the bottom of the top cover and adjacent to the circular third groove. The top cover is fitted together with the base and lies above the locating gasket, the center shaft passes through the center bore, the locating slots are coupled with the corresponding recesses to receive the locating spheres, the protrusion rotates around the circumference of the second groove and is capable of being against two sides of the stop block. The latch abuts against the top of the top cover and fixedly connects to the center shaft.

As described above, the stop block and the protrusion mate with each other that the top cover can rotate relative to the base within an angle of 360 degree or few more than 360 degree to protect a plurality of wire strands mounted through the base. Meanwhile, the locating spheres cooperate with the recesses and locating slots arranged in symmetrical places of the top cover to achieve various locations of the top cover.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
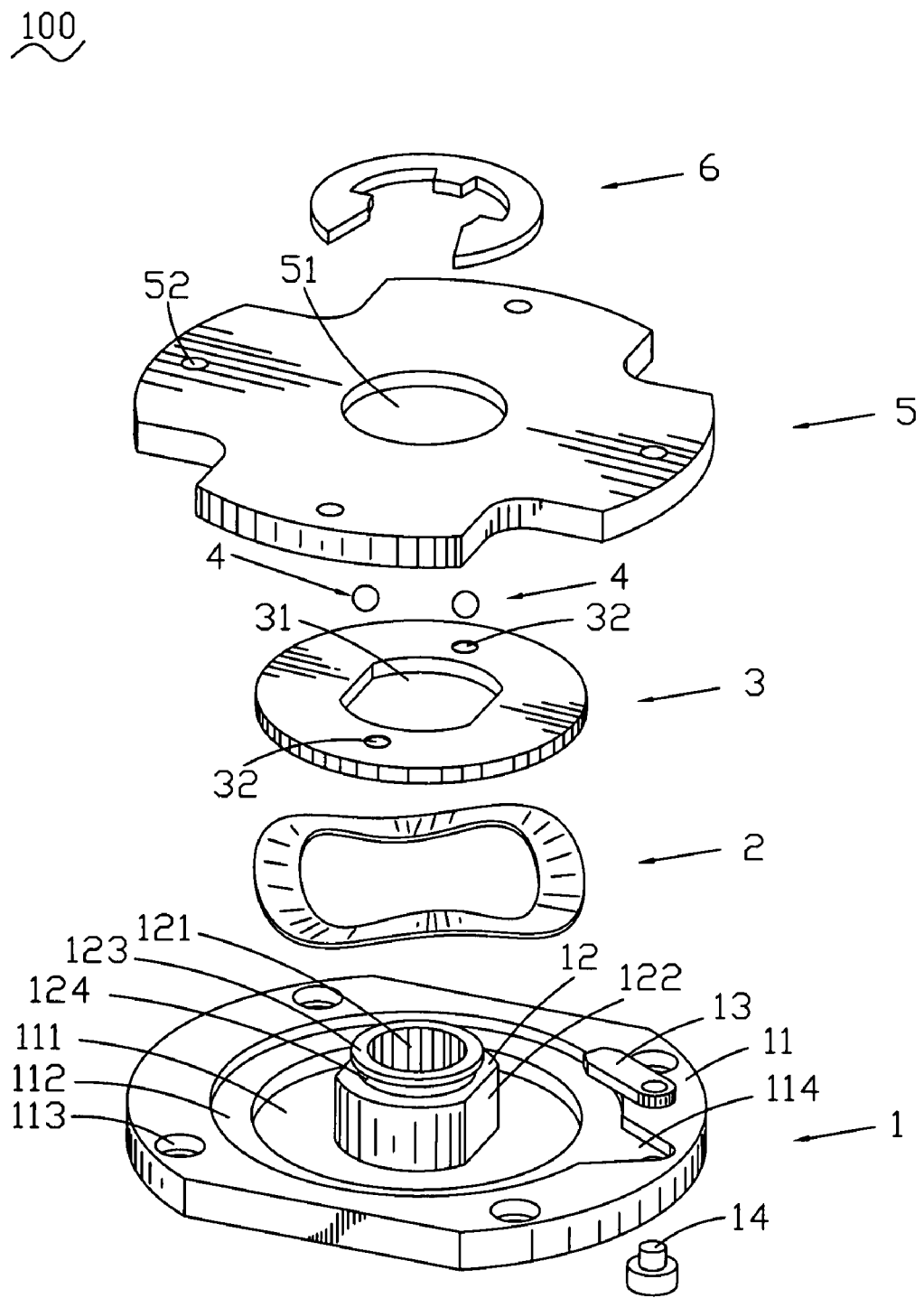
FIG. 1 is an exploded view of a first embodiment of a hinge for circumrotatory location in accordance with the present invention.
Figure 2:
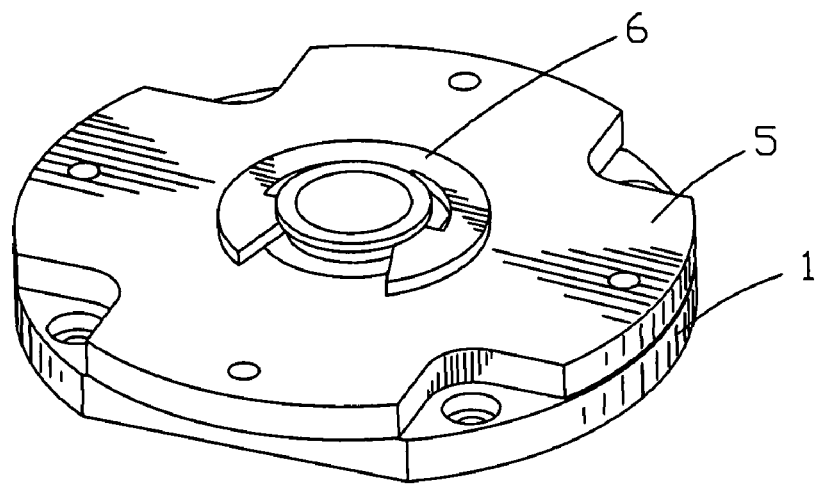
FIG. 2 is a perspective assembly view of FIG. 1.

A first embodiment of a hinge for circumrotatory location 100 is illustrated in FIGS. 1-4. The hinge for circumrotatory location 100 includes a base 1, an elastic gasket 2, a locating gasket 3, a pair of locating sphere 4, a top cover 5 and an E-shaped latch 6.

Figure 3:
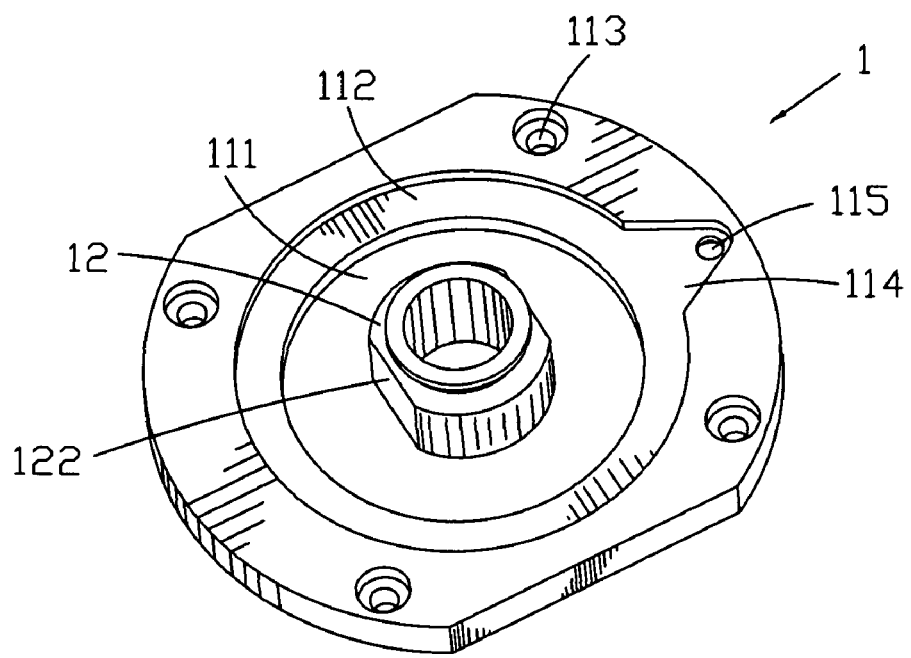
FIG. 3 is a perspective view of a base shown in FIG. 1.

Referring to FIG. 3, the base 1 includes a soleplate 11, a center shaft 12 formed above the soleplate 11 and a stop block 13. The soleplate 11 defines a circular first groove 111, a circular second groove 112 above the first groove 111 and sharing a same axis with the first groove 111, and a retention slot 114 connecting a part of the edge of the second groove 112. The diameter of the second groove 112 is bigger than the diameter of the first groove 111. The retention slot 114 includes a first retention edge 1141 and a second retention edge 1142 with a same length with each other. The two retention edges 1141, 1142 meet each other at ends distant from the second groove 112 to enable the retention slot 114 to show an isoceles triangle shape. Please refer to FIG. 7 and FIG. 8, the bottom of the retention slot 114 defines a bore 115 at a corner that is distant from the second groove 112. Four screw holes 113 are symmetrically formed in the soleplate 11 to fix the hinge for circumrotatory location 100.

The center shaft 12 lying in the center of the first groove 111 projects upward through the first groove 111 and the second groove 112. The diameter of the center shaft 12 is smaller than the diameter of the first groove 111. A top of the center shaft 12 defines a center hole 121 extending downward and passing through the center shaft 12 and the soleplate 11. The center shaft 12 has two parallel side planes 122 along an axis direction of the center shaft 12, a latch portion 123 with a circular latch slot 124 formed as a T-shaped cross section in an axis direction of the center shaft 12.

Figure 7:
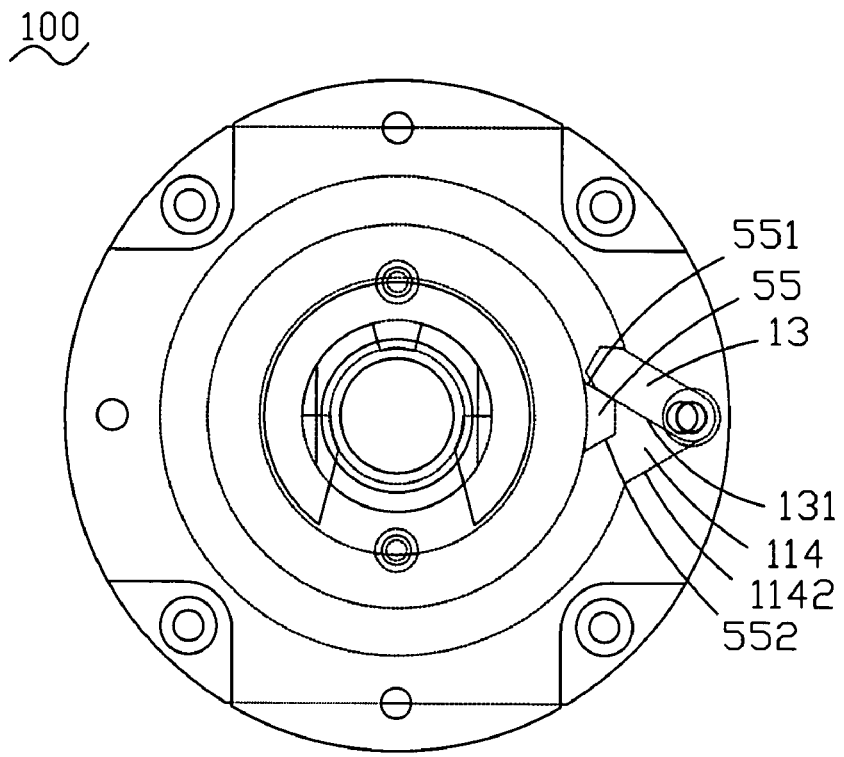
FIG. 7 is a scenograph view of the hinge for circumrotatory location when a stop block is in a first position.
Figure 8:
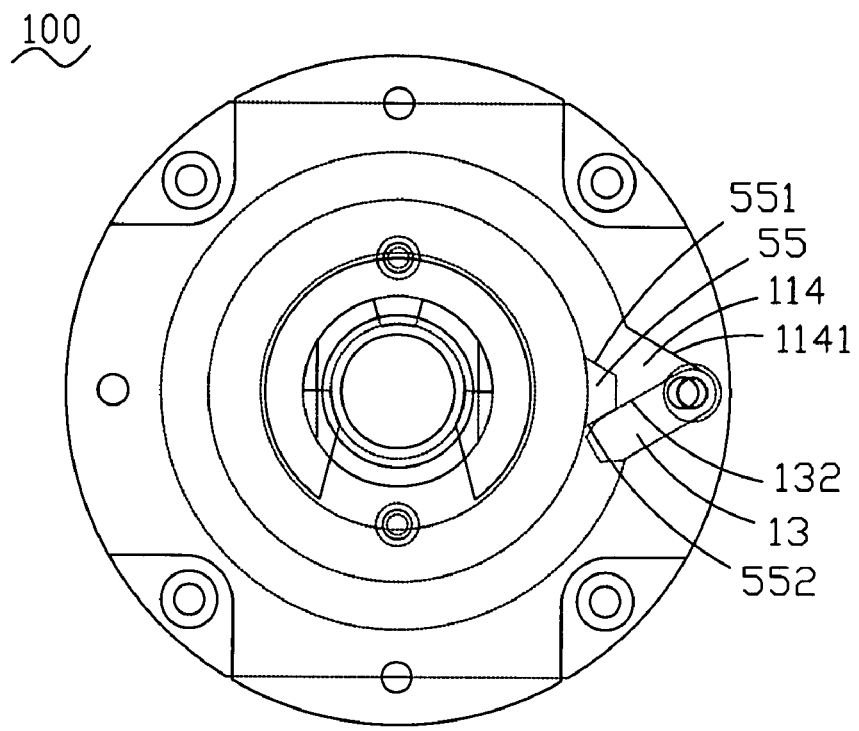
FIG. 8 is a scenograph view of the hinge for circumrotatory location when a stop block is in a second position.
Figure 9:
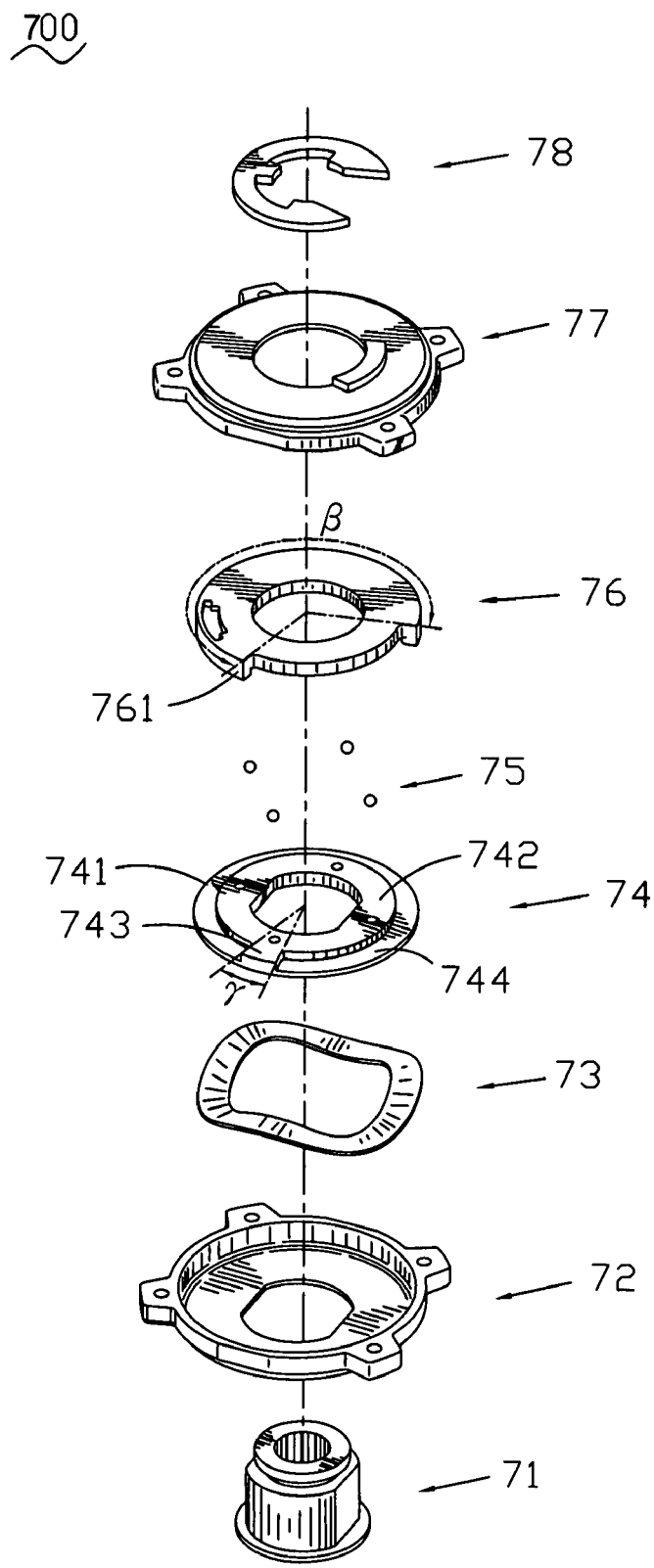
FIG. 9 is an exploded view of a conventional hinge for circumrotatory location.
Figure 10:
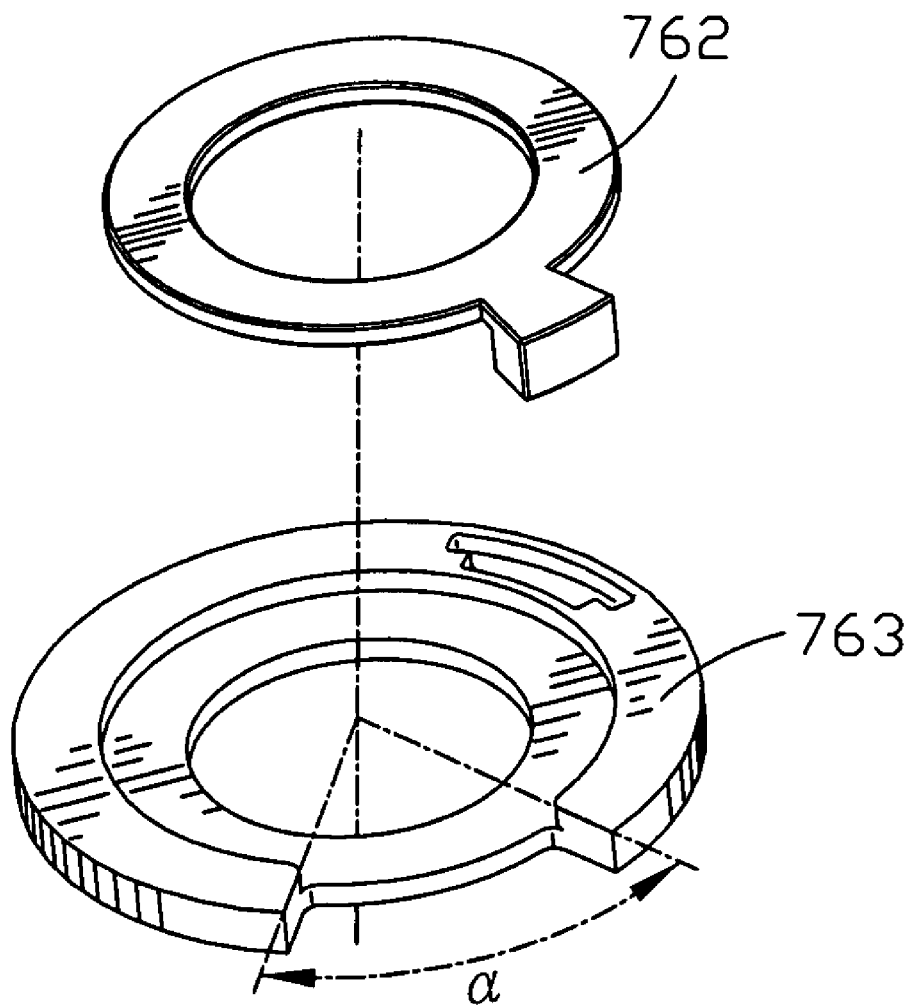
FIG. 10 is an exploded view of a turnplate of the conventional hinge for circumrotatory location.

The stop block 13 has a first stop face 131 and a second stop face 132 spaced from the first stop face 131 (shown in FIG. 7 and FIG. 8). A screw 14 inserts into the bore 115 from a bottom of the bore 115 to fasten the stop block 13 to the soleplate 11, so that the stop block 13 is mounted in the retention slot 114 to swing rightward and leftward around the screw 14 between the two retention edges 1141, 1142. The length of the stop block 13 is proper that one end of the stop block 13 can pivot about the bore 115 and can't beyond the second groove 112.

The elastic gasket 2 is configured in the first groove 111 and encircles and abuts the center shaft 12, the elastic gasket 2 is against a bottom of the first groove 111. The elastic gasket 2 is an undee gasket that provides an elastic force.

The locating gasket 3 is a cirque-shaped. The external diameter of the locating gasket 3 is smaller than the diameter of the first groove 111. The locating gasket 3 has a prolate center hole 31 with two parallel straight edges and two arc edges connecting with the straight edges respectively, two half-ball recesses 32 is centrosymmetrically defined in a top of the locating gasket for receiving a pair of locating spheres 4 respectively. The straight edges of the center hole 31 cooperate with the planes 122 of the center shaft 12, so that the locating gasket 3 is fitted to the center shaft 12 to abut a top of the elastic gasket 2. The locating gasket 3 can only slide upward and downward along the center shaft 12. The locating spheres 4 are a couple of steel balls.

Figure 4:
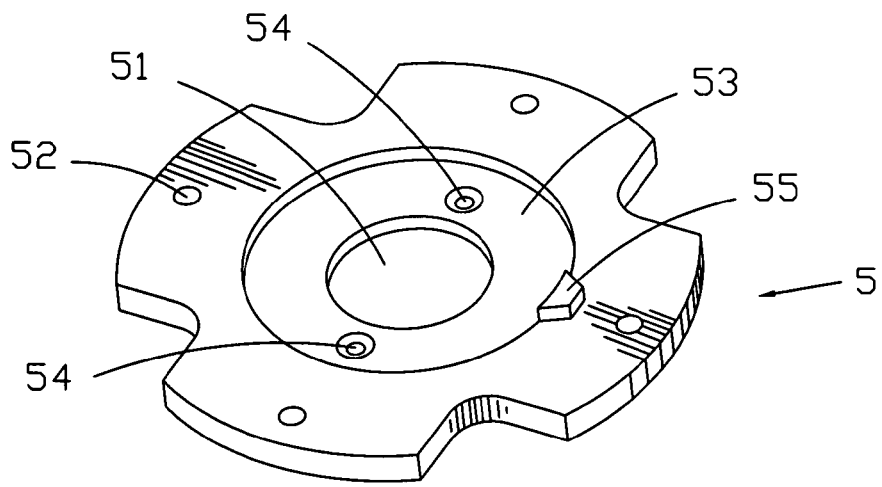
FIG. 4 is a perspective view of a bottom of a top cover shown in FIG. 1.

Referring to FIG. 4, the cross-shaped top cover 5 defines a center bore 51 in a top thereof, and a circular third groove 53 sharing a same axis with the center bore 51 and having a bigger diameter than the center bore 51 in a bottom thereof. Two locating slots 54 are centrosymmetrically formed in the fundus of the third groove 53, a protrusion 55 protrudes downward from the bottom of the top cover 5 and adjacent to the third groove 53, and four fixed holes 52 are symmetrically formed around the top cover 5 to fix the top cover 5. The diameter of the center bore 51 is bigger than the diameter of the center shaft 12, so that the top cover 5 is fitted around the center shaft 12. The locating slots 54 mate with the recesses 32 to receive the locating spheres 4. The depth of the locating slots 54 is smaller than the depth of the recesses 32. The protrusion 55 has a first incline 551 and a second incline 552 gradually approaching to each other to show an isoceles trapezoid shape (shown in FIG. 7 and FIG. 8). The height of the protrusion 55 is smaller than the depth of the second groove 112.

The latch 6 is inserted into the latch slot 124 and is against a top of the top cover 5 so as to fix the elastic gasket 2, the locating gasket 3 and the top cover 5 to the base 1.

With an action of the latch 6, the elastic gasket 2 and the locating gasket 3 are received between the base 1 and the top cover 5, the locating spheres 4 are received in two cavities formed by the recesses 32 and the locating slots 54. The elastic gasket 2 is deformed by an extrusion of the locating gasket 3, so that the locating gasket 3 can be jammed into the first groove 111 firmly. As the locating gasket 3 can only move upward and downward, the locating spheres 4 cooperate with the recesses 32 and the locating slots 54 to position the top cover 5. As the depth of the locating slots 54 is smaller than the depth of the recesses 32, the locating spheres 4 are received in the recesses 32 to separate from the locating slots 54 that the top cover 5 is in an unstable position while the top cover 5 rotating relative to the base 1 with an external force. When the top cover 5 rotates an angle of 180 degree, the locating spheres 4 are jammed into the locating slots 54 again. The top cover 5 is in a stable position with an action of the elastic gasket 2. The top cover 5 can only rotate relative to the base 1 with another external force to achieve the position of the hinge for circumrotatory location 100.

Figure 5:
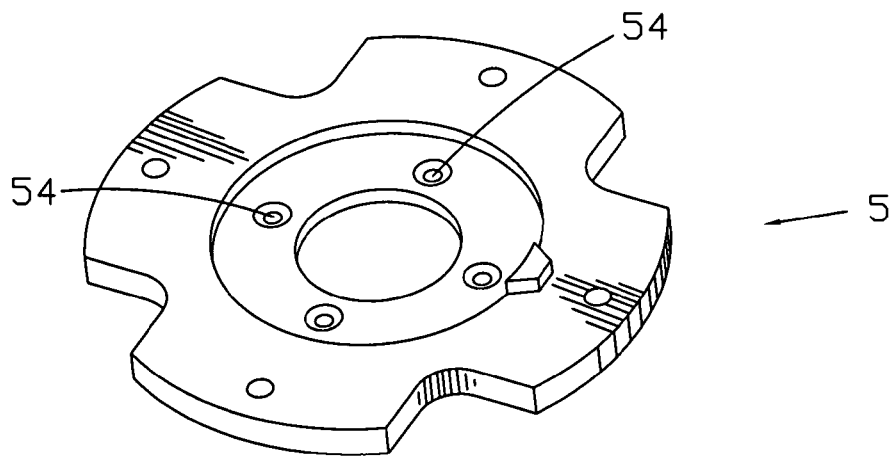
FIG. 5 is a perspective view showing a second embodiment of FIG. 4.
Figure 6:
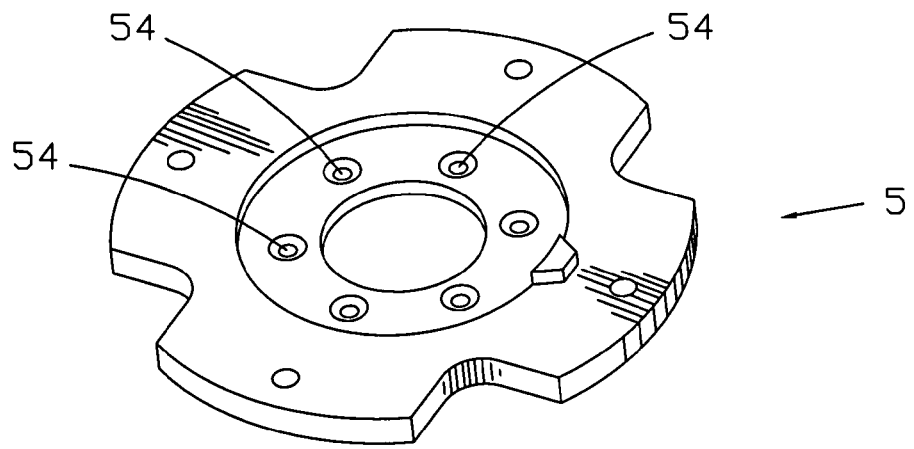
FIG. 6 is a perspective view showing a third embodiment of FIG. 4.

A top cover 5 of a second and third embodiments according to the invention is illustrated in FIGS. 5-6. The top cover 5 defines four locating slots 54 according to the second embodiment, the top cover 5 defines six locating slots 54 according to the third embodiment. Meanwhile, the hinge for circumrotatory location 100 can achieve the position of 90 degree and 60 degree respectively according to the second and third embodiments. So the hinge for circumrotatory location 100 can achieve various locations via the locating slots 54 arranged in symmetrical places of the top cover 5.

In practice, the base 1 keeps a plurality of wire strands through the center hole 121, so that the top cover 5 rotates relative to the base 1 with limit to protect the wire strands. The hinge for circumrotatory location 100 further defines a stop apparatus formed by the stop block 13 and the protrusion 55, so that the top cover 5 can only rotate relative to the base 1 within an angle of 360 degree or few more than 360 degree.

When the latch 6 fastens the top cover 5 to the base 1, the protrusion 55 is in the second groove 112 and rotates within the second groove 112. The first incline 551 of the protrusion 55 abuts against the first stop face 131 of the stop block 13 in a first position where the second stop face 132 abuts against the first retention edge 1141 with a pressure between the protrusion 55 and the stop block 13 (shown in FIG. 7). The second incline 552 of the protrusion 55 abuts against the second stop face 132 of the stop block 13 in a second position where the first stop face 131 abuts against the second retention edge 1142 in another direction (shown in FIG. 8).

When the protrusion 55 obtains a proper shape that the positions of the protrusion 55 superpose each other where the stop block 13 in the first position and the second position, the top cover 5 can rotate in an angle of 360 degree. The first position and the second position are the utmost position of the movement of the stop block 13. The shape of the protrusion 55 can be changed that the top cover 5 rotates relative to the base 1 in an angle of few more than 360 degree to satisfy the practical need.

As described above, the stop block 13 and the protrusion 55 mate with each other that the top cover 5 can rotate relative to the base 1 within an angle of 360 degree or few more than 360 degree to protect the wire strands (not shown). Meanwhile, the locating spheres 4 cooperate with the recesses 32 and the locating slots 54 arranged in symmetrical places of the top cover 5 to achieve various locations of the top cover 5. The design of the invention can achieve various locations with simple structure. The foregoing disclosure and description of the invention are illustrative and explanatory thereof, and various changes may be made without departing from the spirit of the invention.

What is claimed is:

1. A hinge for circumrotatory location comprising:
 a base, having a soleplate with a circular first groove, a circular second groove above the circular first groove which shares a same axis with the circular first groove and has a bigger diameter than the circular first groove, a retention slot connecting a part of the edge of the circular second groove and having two retention edges, a center shaft protruding upward from the center of the circular first groove, and a stop block rotatably mounted in the retention slot and stretching into the circular second groove, the retention edges capable of stopping the stop block;

a locating gasket, fitted to the circular first groove and around the center shaft, at least one pair of recesses centrosymmetrically defined in a top of the locating gasket and receiving a pair of locating spheres;

a top cover, defines a center bore in a top thereof, and a circular third groove sharing a same axis with the center bore and having a bigger diameter than the center bore in a bottom thereof, the circular third groove communicating with the center bore, at least one pair of locating slots centrosymmetrically defined in the fundus of the circular third groove, a protrusion protruding downward from the bottom of the top cover and adjacent to the circular third groove, the top cover fitted together with the base and lying above the locating gasket, the center shaft passing through the center bore, the locating slots coupled with the corresponding recesses to receive the locating spheres, the protrusion rotating around the circumference of the second groove and capable of being against two sides of the stop block; and a latch, abutting against the top of the top cover and fixedly connecting to the center shaft.

2. The hinge for circumrotatory location as claimed in claim 1, wherein the locating sphere is a steel ball.

3. The hinge for circumrotatory location as claimed in claim 1, wherein the protrusion has two same inclines gradually approaching to each other to show an isoceles trapezoid shape.

4. The hinge for circumrotatory location as claimed in claim 3, wherein the two retention edges have the same length and meet each other at ends distant from the second groove to enable the retention slot to show an isoceles triangle shape.

5. The hinge for circumrotatory location as claimed in claim 1, further comprising an elastic gasket configured in the circular first groove and encircling the center shaft, the locating gasket abutting a top of the elastic gasket.

* * * * *